(12) United States Patent
Sadeghi et al.

(10) Patent No.: US 11,817,550 B2
(45) Date of Patent: Nov. 14, 2023

(54) METHOD OF SYNTHESIZING A SOLID-STATE ELECTROLYTE FOR USE IN A LITHIUM-ION BATTERY

(71) Applicants: Ali Sadeghi, Atherton, CA (US); Yuri Vorobyev, San Carlos, CA (US); Gene Kristul, San Francisco, CA (US); Leonid Velikov, San Carlos, CA (US)

(72) Inventors: Ali Sadeghi, Atherton, CA (US); Yuri Vorobyev, San Carlos, CA (US); Gene Kristul, San Francisco, CA (US); Leonid Velikov, San Carlos, CA (US)

( * ) Notice: Subject to any disclaimer, the term of this patent is extended or adjusted under 35 U.S.C. 154(b) by 238 days.

(21) Appl. No.: 17/239,593

(22) Filed: Apr. 24, 2021

(65) Prior Publication Data
US 2022/0344701 A1     Oct. 27, 2022

(51) Int. Cl.
*H01M 10/0562*  (2010.01)
*H01M 10/0525*  (2010.01)

(52) U.S. Cl.
CPC ... *H01M 10/0562* (2013.01); *H01M 10/0525* (2013.01); *H01M 2300/008* (2013.01)

(58) Field of Classification Search
CPC ............... H01M 10/0562; H01M 2300/008
See application file for complete search history.

(56) References Cited

U.S. PATENT DOCUMENTS

| | | | |
|---|---|---|---|
| 6,676,817 B2 | 1/2004 | Noda et al. | |
| 9,246,188 B2 | 1/2016 | Zhao et al. | |
| 9,890,048 B2 | 2/2018 | Goodenough et al. | |
| 10,109,859 B1 | 10/2018 | Goodenough et al. | |
| 10,361,454 B2 | 7/2019 | Goodenough et al. | |
| 10,381,683 B2 | 8/2019 | Goodenough et al. | |
| 10,446,845 B2 | 10/2019 | Goodenough et al. | |

(Continued)

FOREIGN PATENT DOCUMENTS

WO    WO2019129267    4/2019

OTHER PUBLICATIONS

Hanghofer, Isabel, et al. "Untangling the structure and dynamics of lithium-rich anti-perovskites envisaged as solid electrolytes for batteries." Chemistry of materials 30.22 (2018): 8134-8144. (Year: 2018).*

(Continued)

*Primary Examiner* — Sadie White
*Assistant Examiner* — Kayla Elaine Clary (57) ABSTRACT

Proposed is a method of synthesizing a solid-state electrolyte of $Li_3HalO$ formula for use in a lithium-ion battery. The method consists of uniformly mixing at least LiOH and LiHal in a stoichiometric quantities, heating the prepared mixture to a melting temperature and causing a reaction of formula ($2LiOH+LiHal=Li_3HalO+H_2O$) between the at least LiOH and LiHal in a process free of forming a perovskite structure and at a temperature, at which $H_2O$ that forms at the aforementioned reaction is converted into a bound form, whereby a reaction product is obtained. According to another modification of the method, prior to the stage of melting the mixture, a reinforcement mesh is immersed into the mixture, whereby after mixture is solidified, a solid-state electrolyte reinforced with the mixture embedded into its material is obtained.

2 Claims, 7 Drawing Sheets

(56) References Cited

U.S. PATENT DOCUMENTS

| | | |
|---|---|---|
| 10,490,360 B2 | 11/2019 | Goodenough et al. |
| 10,511,055 B2 | 12/2019 | Goodenough et al. |
| 10,804,040 B2 | 12/2020 | Goodenough et al. |
| 2009/0208671 A1* | 8/2009 | Nieh .................... H01M 4/382 |
| | | 427/596 |
| 2016/0368777 A1* | 12/2016 | Goodenough ...... H01M 8/1016 |
| 2017/0170515 A1 | 1/2017 | Yushin et al. |
| 2018/0375148 A1* | 12/2018 | Yersak ..................... C03C 3/32 |
| 2023/0150829 A1* | 5/2023 | Adeli ................... H01M 6/185 |
| | | 429/231.95 |

OTHER PUBLICATIONS

Zhang, Jianzhong, et al. "A new lithium-rich anti-spinel in Li—O—Br system." Chemical Communications 51.47 (2015): 9666-9669. (Year: 2015).*

Solid-State Batteries Advancing Toward Promise of Fast Charging. Long Life, Safer Use Murray Slovick, Dec. 17, 2020, Siemens, Electronic Design).

Braga, et al. Journal of Materials Chemistry, A., 2014, pp. 1-11.

N.A. Reshetnikov and G.M. Unzhakov (Journal of Inorganic Chemistry [Russian—Zh. Neorg. Khim. 1958, 3, 1533-1438.

Data FTsalt—Fact salt databases.

\* cited by examiner

METHOD OF SYNTHESIZING A SOLID-STATE ELECTROLYTE FOR USE IN A LITHIUM-ION BATTERY

FIELD OF THE INVENTION

The present invention relates to the field of electric energy storage devices and, more particularly, to lithium-ion batteries, specifically to a solid electrolytes for solid-state lithium-ion batteries. More specifically, the invention relates to a solid-state electrolyte for lithium-ion battery and a method of manufacturing thereof.

DESCRIPTION OF PRIOR ART

A Solid-state electrolyte is an electrolyte, which is solid, possesses an ionic conductivity, and constitutes an essential characteristic component of a solid-state battery. Solid-state electrolytes are components, which are used instead of liquid electrolytes in electrical energy storage applications, in particular in lithium-ion batteries.

Liquid electrolytes currently used in lithium-ion batteries, which consist of lithium salts dissolved in solvents, are often toxic, corrosive, and flammable. These undesirable properties should be taken into consideration in practical applications. Replacing liquid electrolytes with solid electrolytes, allows avoiding aforementioned disadvantages. In addition, solid electrolytes can be integrated with metal lithium anodes, thus making it possible to obtain a completely solid-state lithium-ion batteries that possess potentially high energy and power density. Nonetheless, existing solid electrolytes are not widely used in lithium-ion batteries because their ionic conductivity is still too low to meet the requirements for efficient energy storage, especially in automobile industry where the use of efficient Li-ion batteries in electric vehicles will allow achieving higher mileage on a single charge.

Promising among many known solid electrolytes of inorganic type is one described, e.g., in U.S. Pat. No. 9,246,188 granted to Zhao, et al. on Jan. 26, 2016. U.S. Pat. No. 9,246,188 discloses solid electrolyte compositions that contain the following substances as main ion-conductive components:

$Li_3ClO, Li_{(3-x)}M_{x/2}OA$, wherein $0<x\leq3$ (where M represents magnesium, calcium, barium, strontium, and/or their mixtures, and where A represents fluoride, chloride, bromide, iodide, and/or their mixtures);

$Li_{(3-x)}N_{(x/3)}OA$, wherein $0\leq x\leq3$ (where N is a trivalent metal, and A represents fluoride, chloride, bromide, iodide, and/or their mixtures);

$Li_3OX_zY_{(1-z)}$, wherein $0\leq z\leq1$, and X and Y are different halides.

An anti-perovskite solid electrolyte may be prepared, e.g., by mechanically mixing precursor powders of lithium oxide ($Li_2O$), calcium oxide (CaO) and lithium halide (e.g., LiCl), ball-milling the powders under a dry argon atmosphere to form a homogeneous mixture, and subjecting the obtained ball-milled mixture to elevated pressures and temperatures. In other embodiments of the sintering method, precursor powders of $Li_2O$, MgO, and lithium halides (LiF, LiCl, and/or LiBr) were mechanically mixed and then subjected to ball milling under a dry argon atmosphere to form a homogeneous powder mixture. The homogeneous powders were examined by X-Ray diffraction.

The entire set of measurements conducted by the authors of U.S. Pat. No. 9,246,188 allowed them to interpret the obtained structures as anti-perovskite, which can be transformed into eutectics. The authors further conceptualized the Li-rich anti-perovskites with a "lithium swamp" that required "trenches" to channel fast ionic transport. The combined manipulation via chemical, electronic, and structural means formed such three-dimensional (3D) "channels" to allow for easy $Li^+$ hopping and transport.

Synthesis was carried out at high pressure in the range of 0.1 GPa to 40 GPa and with an increase in temperature from about room temperature to about 300° C. It worth mentioning that synthesis was performed in a closed space in argon atmosphere under water-free conditions, i.e., with dried components.

An alternative method for obtaining solid-state electrolytes of the same family is disclosed in U.S. Pat. No. 9,890,048 granted to Goodenough, et al. on Feb. 13, 2018.

U.S. Pat. No. 9,890,048 discloses a method of forming a dried, water-solvated glass/amorphous solid. According to the method, a crystalline sodium-ion $Na^+$ or lithium-ion $Li^+$ electronic insulator or its constituent precursors comprising at least one $Na^+$ or $Li^+$ bonded to oxygen O, hydroxide OH, and/or to at least one halide are transformed into a water-solvated glass/amorphous $Na^+$ or $Li^+$ ion-conducting solid having a water solvation limit by adding water in an amount less than or equal to the water salvation limit of the glass/amorphous solid. The obtained water-solvated glass/amorphous $Na^+$ or $Li^+$ ion-conducting solid is heated in an alternating current (ac) or a direct current (dc) electric field to orient dipoles present in the water-solvated glass/amorphous $Na^+$ or $Li^+$ ion-conducting solid. The water-solvated glass/amorphous $Na^+$ or $Li^+$ ion-conducting solid is then cooled to room temperature such that dipoles present in the water-solvated glass/amorphous $Na^+$ or $Li^+$ ion-conducting solid remain oriented.

The authors of U.S. Pat. No. 9,890,048 suggested the following method of synthesis. LiCl, and Li, Mg, Ca or Ba hydroxides, which participated in the synthesis, are highly hydroscopic, and therefore prior to synthesis they were subject to drying. After drying, appropriate components were weighed in stoichiometric amounts and mixed. Then, by adding a few drops of deionized water, a paste was formed and introduced in a Teflon reactor, which was sealed. The reactor was heated at 220° C. to 240° C. for at least 4 days before it was opened to let the water evaporate for approximately 1 h. Then the product was closed in glassware and allowed to cool to room temperature.

A vacuum pump was used to dry the water out. A few hours were needed for the sample to become 100% crystalline $Li_3ClO$ or its doped homolog. As a result, the authors obtained powders, and if the powders were too dry, it was impossible to obtain a glassy sample, even after 5-6 heating/cooling cycles. Pellets were obtained as well (with a cold press).

A part of the samples was manipulated in air, after synthesis, since it proportionated the formation of hydroxides that were beneficial to glass formation.

The cooling process took place in the sand bath; it was slow, in the screw pressed cell. Glasses were obtained after hydroxides ran out (eventually this phase works as a containing surface, helping glass formation).

U.S. Pat. No. 10,109,859; 10,361,454; 10,381,683; 10,446,845; 10,490,360; 10,511,055; and 10,804,040 are aimed at further development of the electrolytes described in U.S. Pat. Nos. 9,890,048 and 9,246,188 as well as at broadening their practical application.

Some authors noted that the aforementioned solid electrolytes manufactured by melting appeared to be brittle and therefore unsuitable for the formation of thin layers needed for use in high-current solid Li-ion batteries (see: Solid-State Batteries Advancing Toward Promise of Fast Charging, Long Life, Safer Use Murray Slovick, Dec. 17, 2020, Siemens, *Electronic Design*).

Moreover, the obtained layers have low resistance to compression, which is needed in the battery assembling process.

Attempts have made in the industry to reinforce homogeneous electrolytes in general. These attempts are described in U.S. Pat. No. 6,676,817 issued on Jan. 13, 2004 to Y. Noda, et al. and in US Patent Application Publication No. 20170170515 published on Jun. 15, 2017, etc.

However, the reinforcement technics described in the last-mentioned patents are incompatible with the procedures and products disclosed in previously described patents related to electrolytes used in solid Li-ion batteries.

SUMMARY OF THE INVENTION

The present invention relates to the field of batteries, more specifically to Li-ion batteries, in particular to a method of synthesis of solid electrolytes and to the structures and methods of manufacturing non-reinforced or reinforced solid Li-ion-conductive electrolytes for use as components of Li-ion batteries.

According to one aspect of the invention, the method of the invention consists of preparing a uniform mixture of a reaction product consisting of at least two solid powdered constituents, such as LiCl, LiOH, or their derivatives, melting the obtained mixture in a mold of a desired shape for 20 min to 2 hours at a temperature of 200 to 300° C., cooling the heated substance to room temperature, placing the cooled product into a medium of inert gas in a closed sealed chamber, thus obtaining a final lithium-ion solid electrolyte with properties equal or exceeding the properties of similar products known in the art. The proposed method does not involve an anti-perovskite-formation step, is suitable for mass production, and is characterized by low cost and simplicity. The obtained solid electrolyte may have a thickness from several hundred microns to several centimeters.

As compared to other conventional and known methods used for the production of Li ion-conductive solid electrolytes, the proposed method is performed without the use of complicated and time-consuming processes needed for growing anti-perovskite crystal structures and converting thereof into an amorphous state.

According to another aspect of the invention, in order to increase resistance to brittleness, the method of the invention is aimed at reinforcing the material of the solid-state electrolyte and therefore consists of reinforcing a Li ion-conductive solid electrolyte with a thin reinforcement mesh, which is embedded into the body of the solid electrolyte. Such a reinforcement makes it possible to solve the problem of thinning the aforementioned products and thus facilitates their use in high-current batteries.

In the method of the second modification, the reinforced solid electrolyte is obtained by first forming a layer of a mixture of a reaction product consisting of at least two solid powdered constituents of the type mentioned in the first modification. The mixture is placed into a mold of a desired shape, and a reinforcement mesh is placed into the mixture. Next, the obtained structure is subjected to the same steps (melting, cooling, etc.) as in the first modification. As a result, a thin reinforced solid electrolyte, which possesses high strength and resistance to compaction, is obtained. The final solid electrolytes may have a thickness as low as 40 microns or even less.

DETAILED DESCRIPTION OF THE INVENTION

The present invention relates to the field of electric energy storage devices and, more particularly, to lithium-ion batteries, specifically to solid electrolytes for solid-state lithium-ion batteries.

The detailed preceding description of the prior art demonstrates complexity, high cost, and time consumption of the known methods used for synthesis of solid-state electrolytes, which are a subject of the present invention. It is important to note that methods discussed in the prior-art section involve a complicated primary step of synthesis of crystalline anti-perovskite structure with subsequent conversion of the obtained structure into an amorphous state. In contrast to this, the method of the present invention suggests direct one-stage synthesis of solid electrolytes of the aforementioned group without resorting to the anti-perovskite phase formation. The method of the invention provides significant decrease in costs and production time along with simplification of the equipment needed for synthesis.

According to one aspect of the invention, the method of the invention consists of synthesis of a solid $Li_3HalO$ (where Hal is Cl, Br, I) electrolyte following the well-known reaction ($2LiOH + LiHal = Li_3HalO + H_2O$) directly from starting reagents without preliminary synthesis of anti-perovskites. In other words, all the components are selected in appropriate molar ratios and uniformly mixed. It is allowable to introduce small amounts of Ca, Ba, Mg, or Sr oxides with at least 98% purity to create solid solutions in the structure of the solid electrolyte being produced. The main reagents are LiOH of 98% purity and LiCl of 99.5% purity. The oxides of Ca, Ba, Mg, or Sr are added in amounts of 0.001 wt. % to 6 wt. %. If they are added in amount less than 0.001 wt. %, they do not produce a noticeable effect but if the added amounts exceed the upper limit, they may lead to significant increase in the melting point.

Figure 1A:
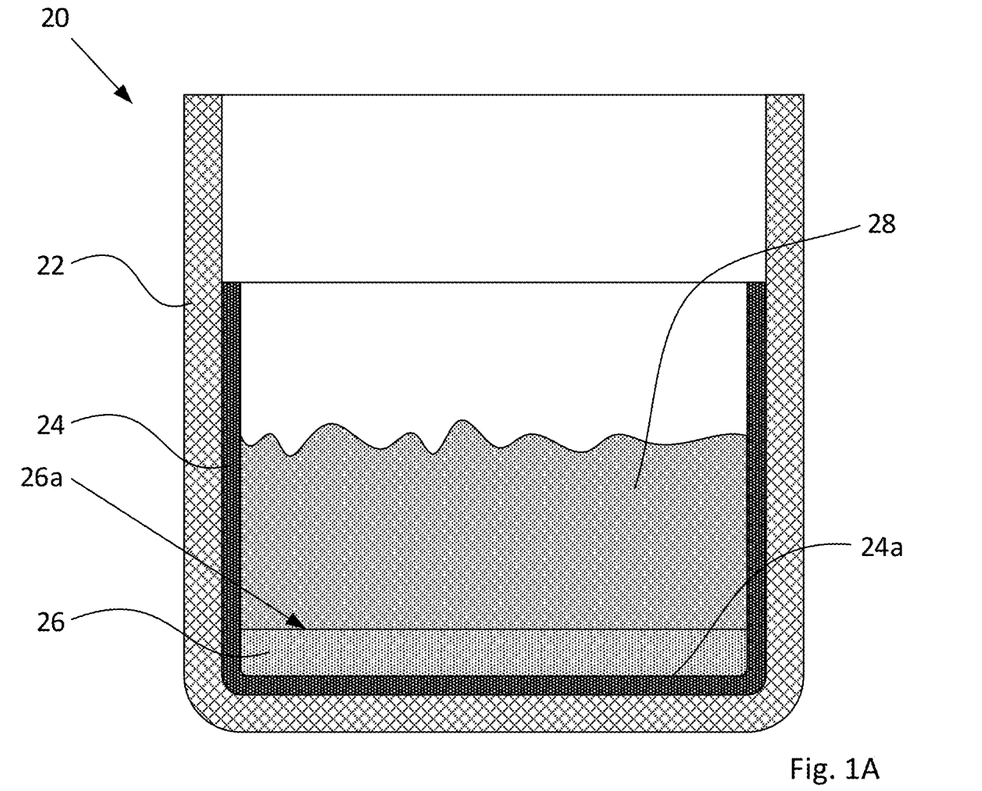
FIG. 1A is a vertical cross-sectional view of tools for synthesis of a solid Li-ion electrolyte of the present invention.

Solid electrolyte synthesizing tools 20 for synthesis are schematically shown in FIG. 1A in a vertical cross section. The tools 20 consist of a container 22 made of a heat-resistant material, e.g., nickel or stainless steel. Inserted into the container 22 is a cuvette 24 made, e.g., of an aluminum foil having, e.g., 16 mm in diameter. A stainless-steel pellet 26 with a well-polished upper surface 26a is placed onto the bottom 24a of the cuvette 24. The container 22 with the cuvette 24 and the pellet 26 is preheated to a temperature of 200° C. and then filled with an appropriate quantity of the aforementioned mixture 28, which is placed into the cuvette over the pellet 26.

Next, the temperature is increased in a stepwise manner with 5 min intervals to 220° C., 250° C., 270° C., and 300° C. until complete melting of the mixture is achieved.

Figure 1B:
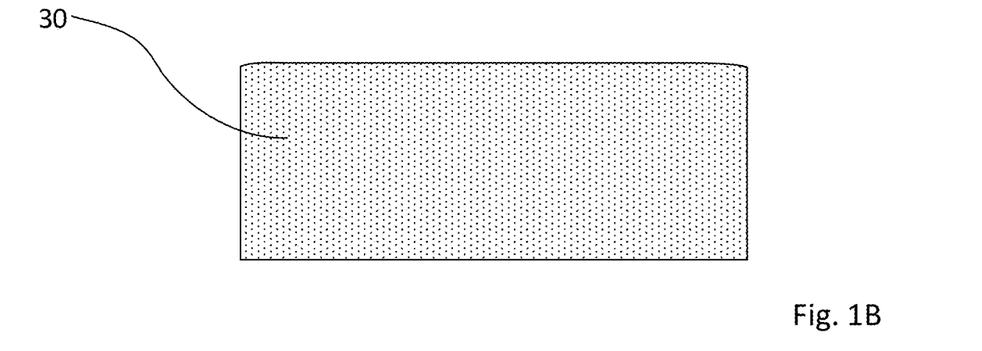
FIG. 1B is a diametrical cross-sectional view of the solid Li-ion electrolyte obtained by the method according to one aspect of the invention.
Figure 2:
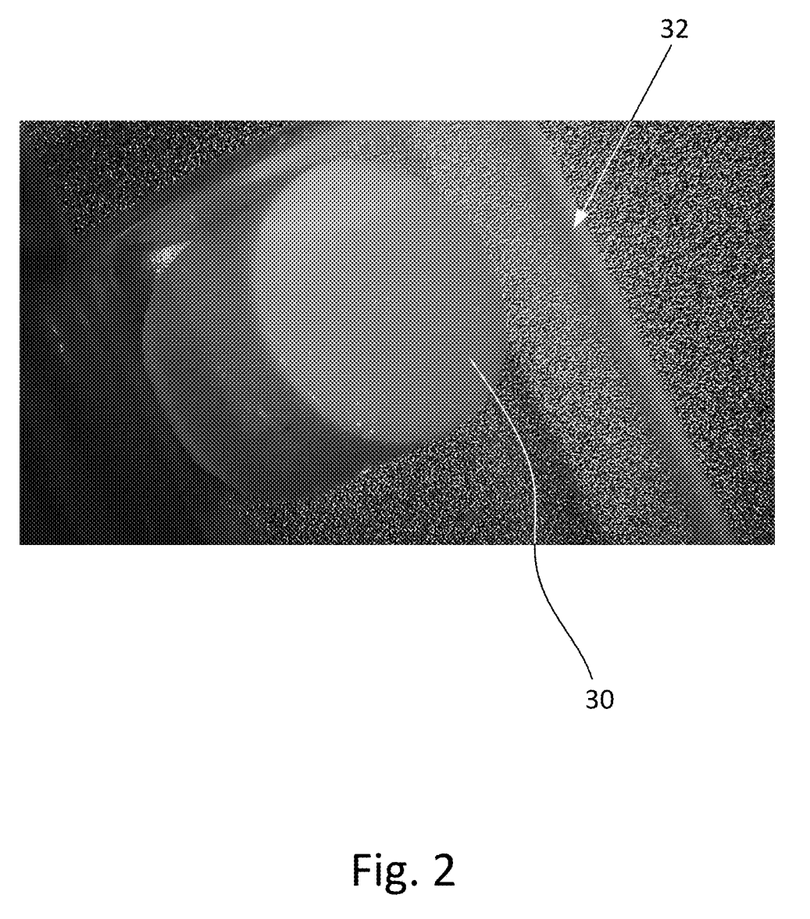
FIG. 2 is a photograph of a sealed container filled with argon and containing the product shown in FIG. 1B.

The assembly of the container, cuvette, melt, and pellet is cooled to a temperature at which the melt solidifies to form a solid substance 30 (FIG. 1B) and then is cooled to about 100° C. and is placed into a sealed container 32 filled with argon (FIG. 2). FIG. 2 is a photograph of the sealed container 32, which is filled with argon and contains the obtained product 30.

In FIG. 1B, the obtained solid Li-ion electrolyte 30, which in this example presumably has a round top view, is shown in a diametrical cross-section.

According to another aspect of the invention, the method of the invention consists of synthesis of a reinforced solid $Li_3HalO$ (where Hal is Cl, Br, I) electrolyte. The mixture is prepared in the same way as in the process of the first modification, i.e., the process follows the well-known reaction ($2LiOH+LiHal=Li_3HalO+H_2O$) directly from starting reagents without preliminary synthesis of anti-perovskites. In other words, all the components are selected in appropriate molar ratios. It is allowable to introduce small amounts (in amounts of hundredths of wt. %) of additives such as Ca, Ba, Mg, or Sr oxides having a purity of at least 98% to create solid solutions in the structure of the solid electrolyte being produced. The main reagents are LiOH of 98% purity and LiCl of 99.5% purity.

Figure 3A:
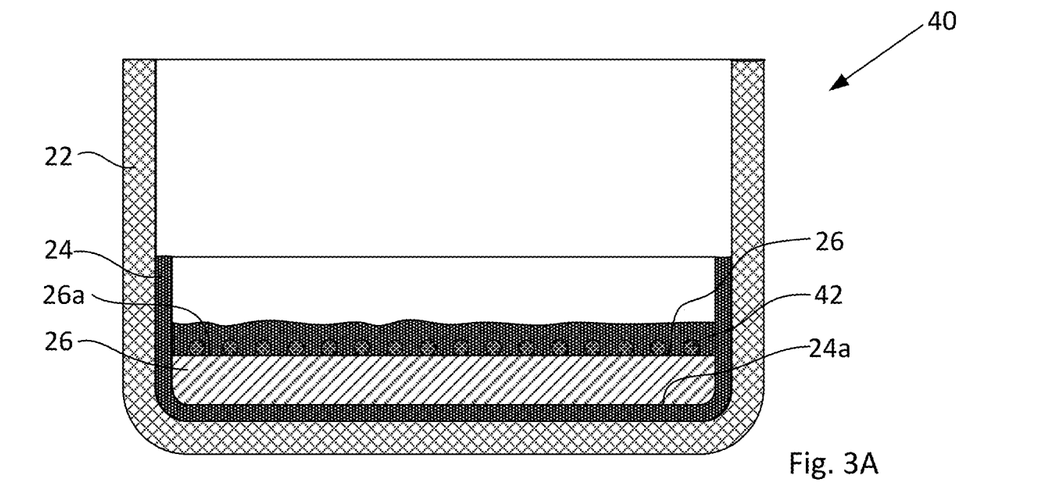
FIG. 3A is a vertical cross-sectional view similar to FIG. 1A that illustrates synthesis of a Li-ion electrolyte that is reinforced by a mesh embedded in the material of the electrolyte, FIG. 3A showing a stage of filling a cuvette with a powdered mixture over the mesh.
Figure 3B:
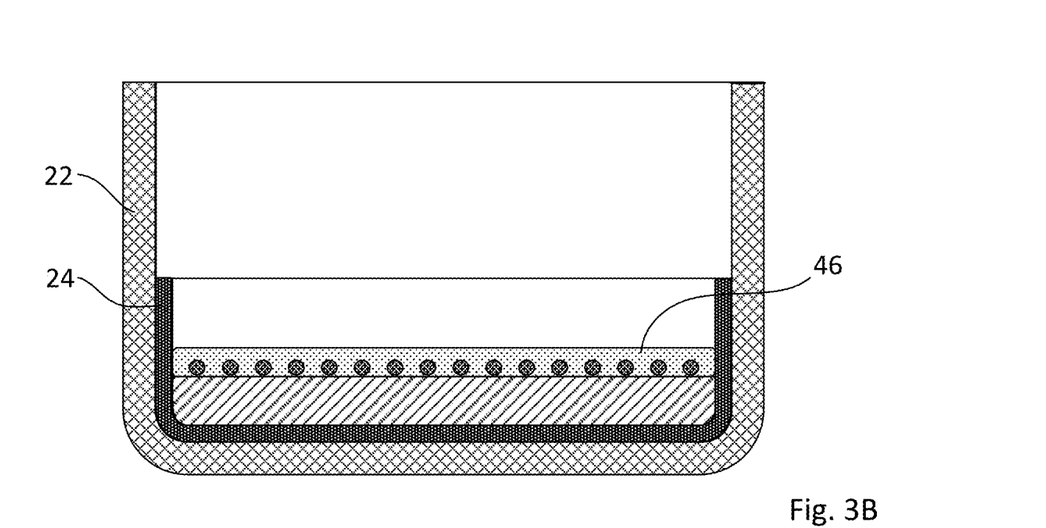
FIG. 3B is a view similar to FIG. 3A showing the Li-ion electrolyte in a solidified state with the reinforcement mesh embedded in the material of the solid electrolyte.

Solid electrolyte synthesizing tools 40 for synthesis are schematically shown in FIGS. 3A and 3B in a vertical cross section. The tools 40 are the same as the tools 20 of the first modification but the process is different in that it involves a step of reinforcement of the target product. In other words, the tools consist of a container 22 made of a heat-resistant material, e.g., nickel or stainless steel. Inserted into the container 22 is a cuvette 24 made, e.g., of an aluminum foil having, e.g., 16 mm in diameter. A stainless-steel pellet 26 with a well-polished upper surface 26a is placed onto the bottom 24a of the cuvette 24, and a mesh 42 for reinforcing the product being manufactured is then placed onto a well-polished upper surface 26a.

Next, the temperature is increased in a stepwise manner with 5 min intervals to 220° C., 250° C., 270° C., and 300° C. until complete melting of the mixture is achieved.

The assembly of the container, cuvette, mesh, melt, and pellet is cooled to a temperature at which the melt solidifies to form a solid substance 46 (FIG. 3B) and then is cooled to about 100° C. The cuvette 24 is removed from the container 22 and the obtained solid electrolyte 46 is extracted from the cuvette and is placed into a sealed container filled with argon similar to container 32 shown in FIG. 2.

Figure 3C:
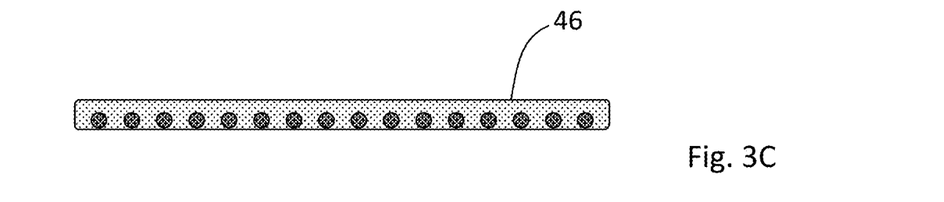
FIG. 3C is a diametrical cross-sectional view of the reinforced solid Li-ion electrolyte of FIG. 3B, which in a top view has a round shape.

The obtained reinforced solid Li-ion electrolyte 46, which in this example presumably has a round top view, is shown in a diametrical cross-section in FIG. 3C. The cuvette 24 may be reused or discarded.

Figure 3D:
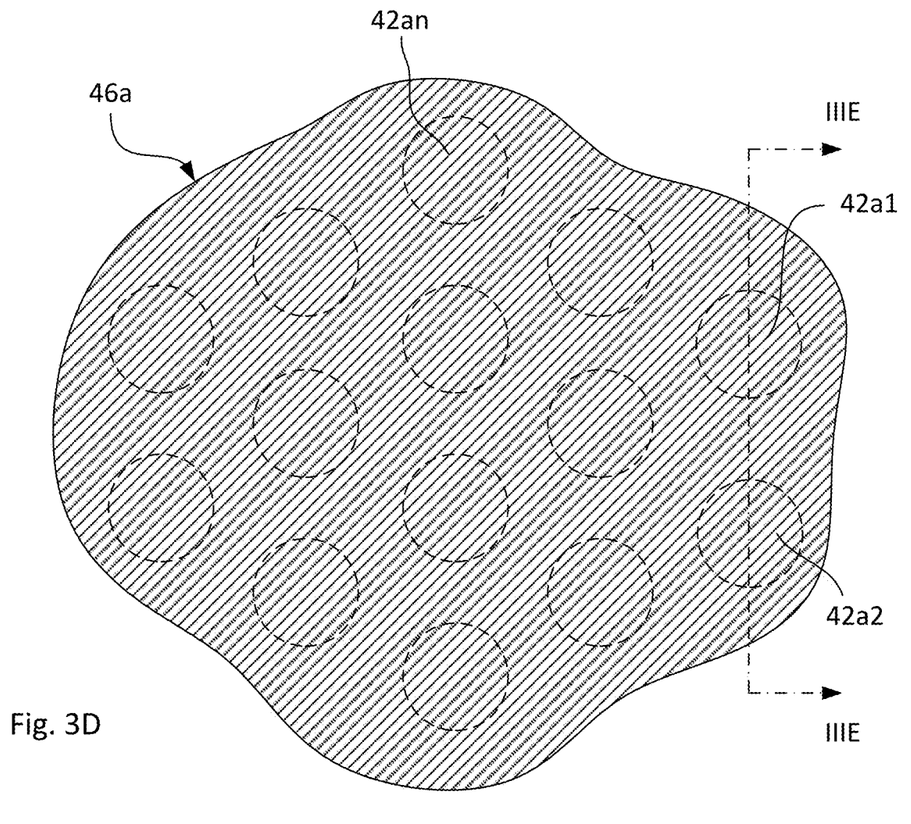
FIG. 3D is a top view of a solid-state electrolyte in the form of a thin plate having embedded reinforcement mesh with holes.
Figure 3E:
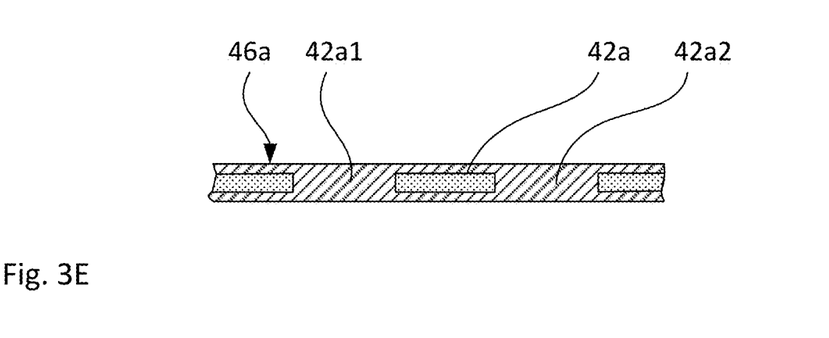
FIG. 3E is a diametrical cross-sectional view of the solid-state electrolyte along line IIIE-IIIE of FIG. 3D.

The mesh is made, e.g., from metal or dielectric. It is important that the mesh be made from a heat-resistant material that possesses good properties of wetting and chemical neutrality with respect to the melt of the mixture used in the process. From this point of view, appropriate metallic materials of the mesh are nickel, stainless steel, etc. An example of dielectrics is mica, from which a mesh can be made, e.g., by forming multiple holes in a mica plate. The mica plate may be comprised of a thin film having a thickness of from about 10 microns to several millimeters. The holes may be arranged with regular intervals or at random. An example of a mesh with regular interval of holes or cells embedded into the material of the solid-state electrolyte 46a is shown in FIG. 3D and FIG. 3E, where FIG. 3D is a top view of the solid-state electrolyte 46a in the form of a thin plate having embedded reinforcement mesh 42a with holes 42a1, 42a2, . . . 42an. FIG. 3E is a diametrical cross-section of the solid-state electrolyte 46a along line IIIE-IIIE of FIG. 3D.

Alternatively, the reinforcement mesh can be woven from a thin, e.g., nickel wire with a wire thickness of about 10 microns or thicker. In that case, the final solid-state electrolyte plate may be as thin as about 25 microns. The thickness of the plate may be further reduced by reducing the thickness of the wire from which the mesh is made.

The reinforcement net is not necessarily round in its shape and may be square, rectangular or any other shape.

Figure 3F:
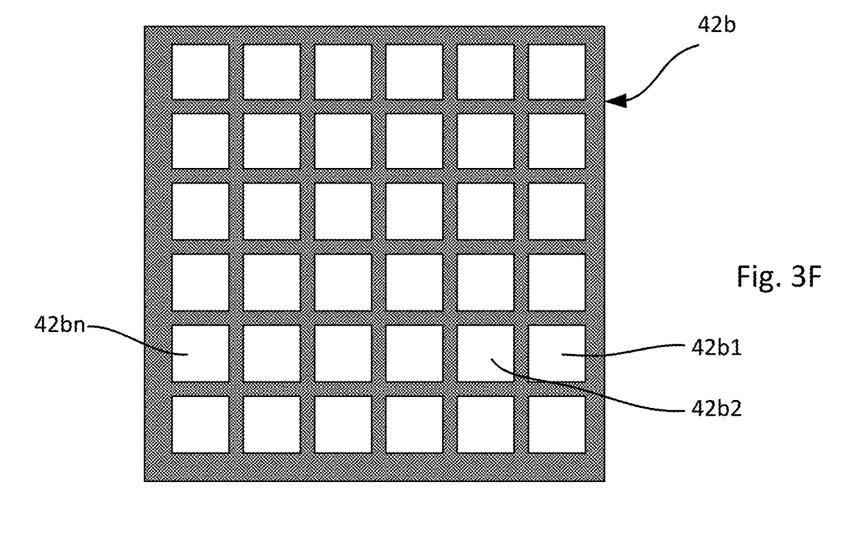
FIG. 3F is an example of a reinforcement mesh having a square-shape top view.
Figure 3G:
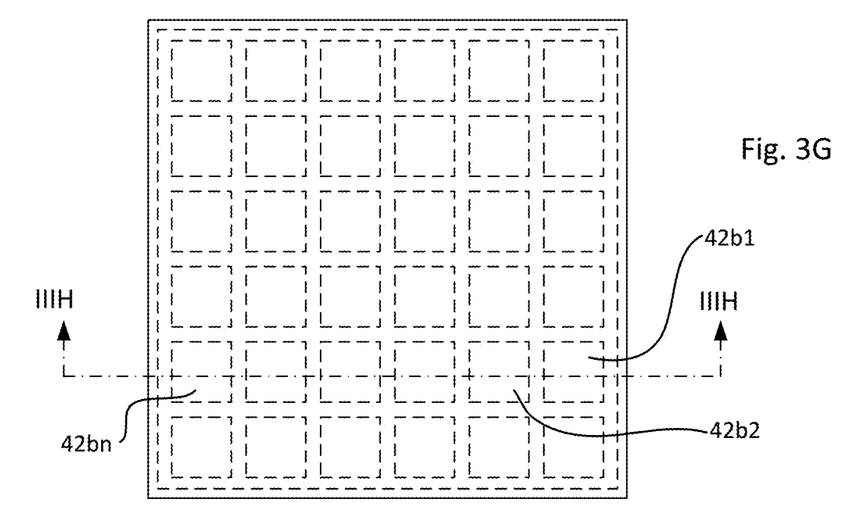
FIG. 3G is a top view of the solid-state electrolyte of FIG. 3F with the reinforcement mesh embedded into the material of the solidified mixture.

An example of a reinforcement mesh 42b having a square shape in a top view is shown in FIG. 3F, where reference numerals 42b1, 42b2, . . . 42bn designate cells or holes formed in the mesh. FIG. 3G is a top view of a solid-state electrolyte 46b of a square shape with the reinforcement mesh 42b embedded into the material of the solidified mixture, i.e., in the body of the final product 46b.

Figure 3H:
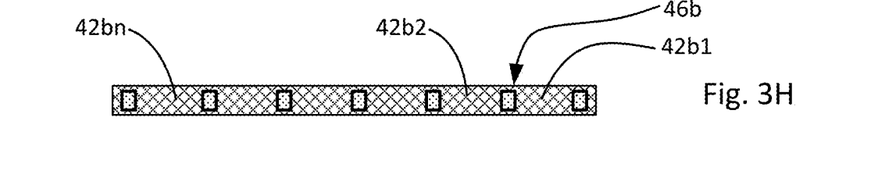
FIG. 3H is a cross-sectional view of the solid-state electrolyte along line IIIH-IIIH of FIG. 3G.

FIG. 3H is a cross-sectional view of the solid-state electrolyte 46b along line IIIH-IIIH of FIG. 3G.

The cells 42b1, 42b2 . . . 42bn can be formed, e.g., by etching or stamping a thin aluminum or nickel foil as thin as, e.g. 5 microns. In case of aluminum, the surface of the mesh should be passivated.

According to another aspect of the invention, in the process shown in FIGS. 3A and 3B, instead of covering the mesh 42 with a mixture 44 and subsequent embedding of the mesh 42 in the molten mixture, it is possible to place the mesh 42 onto the stainless-steel pellet 26 by immersing the mesh into the pre-melted mixture 44.

As mentioned in the work of Braga et al. that describes the synthesis of solid electrolytes for use in solid Li-ion batteries (see Journal of Materials Chemistry, A., 2014, 2014, pages 1-11), it is possible to create inexpensive solid lithium electrolytes with the $Li_3ClO$. However, based on the graphs (see FIGS. 1 to 3 of the aforementioned work), it is obvious that the basic $Li_3ClO$ compound, obtained by the authors, has an admixture of water of crystallization in the bound form of hydrates of lithium chlorides such as $Li_5(OH)_2Cl_3$ (see X-ray phase analysis, FIG. 1 of the Braga, et al.

publication) as well as in the form (FIG. 2), where, in addition to the temperature determined by the authors as the glass transition temperature of 136° C., one can see a characteristic change in the curve around 70-100° C. indicating the existence of adsorbed water.

Figure 4A:
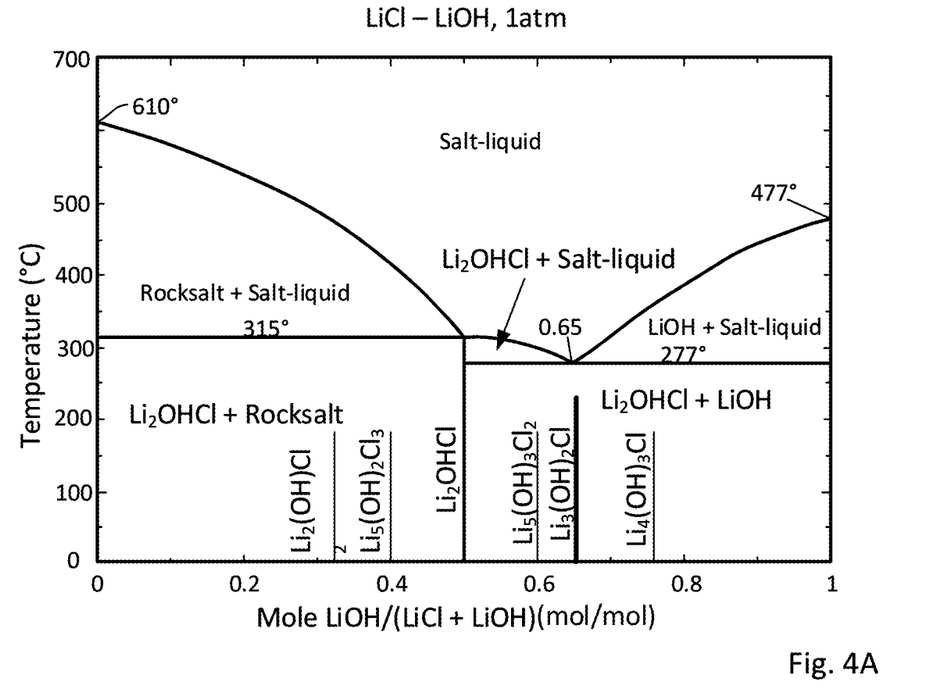
FIG. 4A is a LiCl—LiOH state phase diagram.

FIG. 4A of the present patent specification is a LiCl—LiOH state diagram (see N. A. Reshetnikov and. G. M. Unzhakov (Journal of Inorganic Chemistry [Russian—Zh. Neorg. Khim. 1958, 3, 1433-1438]). Thermographic and visual polythermal methods were used in studies of LiOH—LiCl and LiOH—NaOH systems. Binary compound forms shown in both systems were not re-examined and are characterized by the presence of only one compound ($Li_2OHCl$).

This diagram shows the compositions currently mentioned in the literature. The composition of $Li_3(OH)_2Cl$ is eutectic and, as follows from the above, this mixture is the initial one used in the synthesis of anti-perovskite (2LiOH+LiCl). On the other hand, as follows from the reaction, the composition decomposes into water and $Li_3OCl$, even with simple mixing (see International Patent Publication WO2019129267 issued on 7 Apr. 2019; inventors: B. C. Bogdan, et al.).

Thus, in reality, only a phase diagram of $Li_3ClO$—$Li_3ClO \cdot 2H_2O$ exists for this composition. After removing the adsorbed water, the composition of $Li_3ClO$ begins to melt at 220° C. When the bound water is removed, further stepwise increase, in temperature (e.g. to 250° C., 270° C., and 300° C.) with subsequent cooling leads to a respective increase in the melting point. Batteries made from the melts of the above-mentioned compositions have a current that decreases with an increase in the melting point, i.e., due to the removal of water. A similar effect is also achieved with the presence in the composition $Li_3ClO$ of additives such as Mg, Ba, Ca, Sr or other elements in the form of solid solutions, which distort the structure of the original composition in such a way that hydroxyl ions with one or another form of water can be incorporated into the structure of the electrolyte and thus increase ionic conductivity of the electrolyte.

Figure 4B:
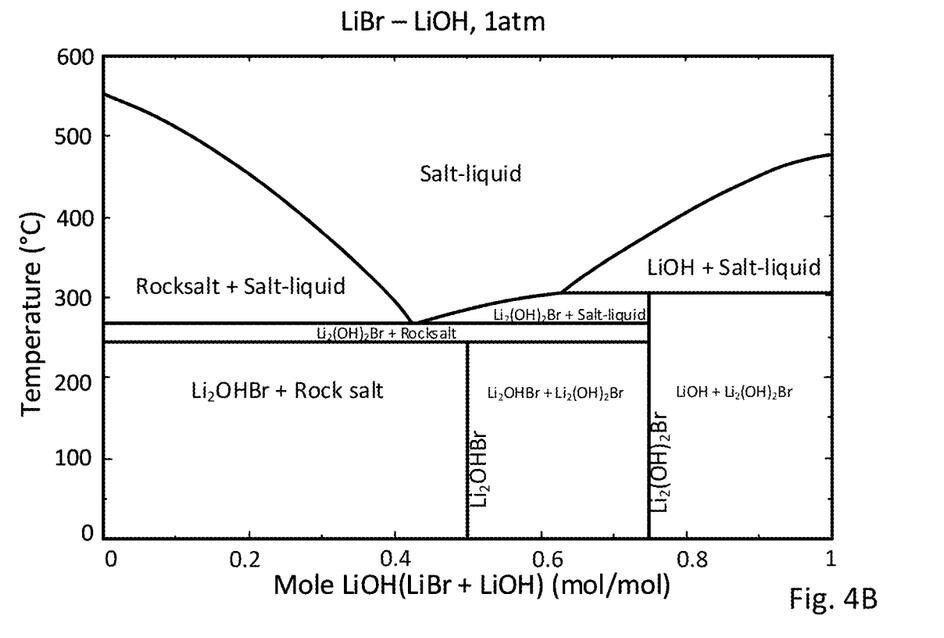
FIG. 4B is a LiBr—LiOH state phase diagram.

For the LiBr—LIOH compositions, the phase diagram of FIG. 4B [see Data FTsalt—FACT salt databases] shows that at atmospheric pressure the $Li_3BrO$ compound is not observed. However, the properties of the melt of this composition also depend on the amount of water and the size of the impurity ions.

Figure 4C:
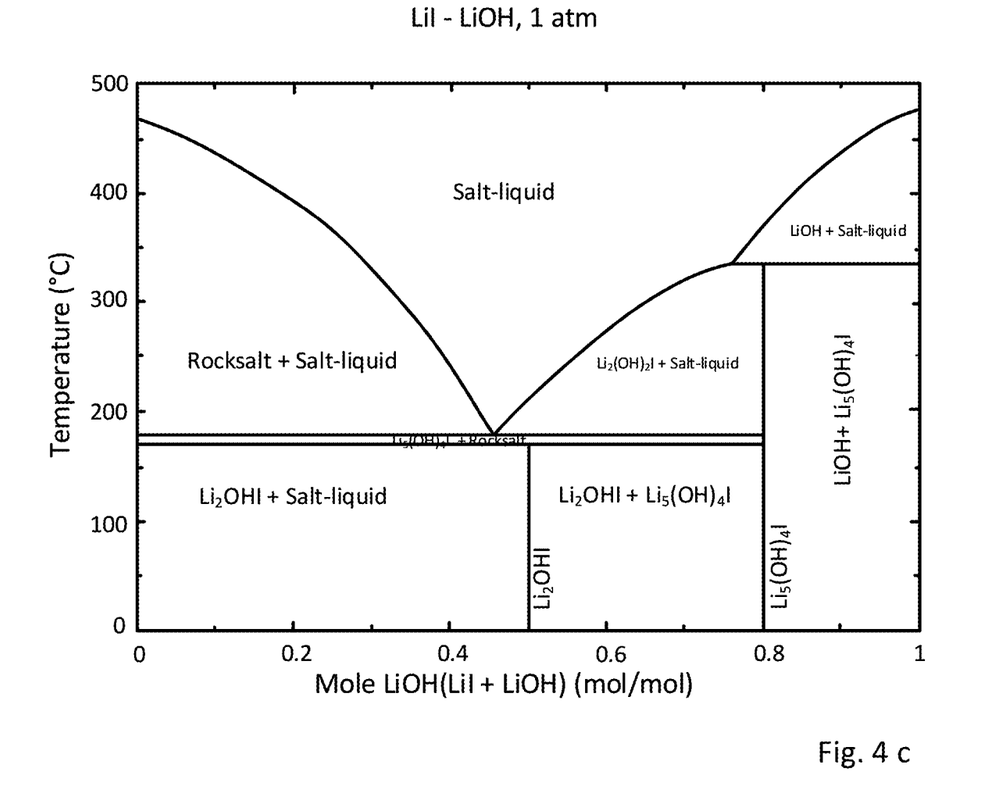
FIG. 4C is a LiI—LiOH state phase diagram.

The state diagram of LiOH—LiI, which is shown in FIG. 4C [see Data FTsalt—FACT salt databases] also does not contain a $Li_3IO$ compound, however, with a general coincidence of the properties of electrolytes, depending on the presence of water, the diagram it is characterized by the expectedly lower melting temperatures of mixtures and compounds.

It is known that manufacturers try to avoid the presence of water in lithium batteries due to the undesirable reactions of lithium with the release of hydrogen. However, it should be emphasized that in our case we are talking about bound water, which will be released at temperatures above 200° C. On the other hand, it is obvious that we have deal with a special type of ionic conductivity in such batteries, which is fundamentally different from that in traditional batteries. In lithium batteries of a new type, the trace residual water can be redistributed, ultimately resulting in improved battery performance over time.

Thus, it has been shown the method of the invention for synthesizing a solid-state electrolyte of $Li_3HalO$ formula for use in a lithium-ion battery consists of uniformly mixing at least LiOH and LiHal in stoichiometric quantities thus forming a uniform mixture of the at least LiOH and LiHal, heating the uniform mixture to a mixture melting temperature thus forming a mixture melt, causing a reaction of formula ($2LiOH+LiHal=Li_3HalO+H_2O$) between the at least LiOH and LiHal in a process free of forming an anti-perovskite structure and at a temperature, at which $H_2O$ that is formed in the aforementioned reaction is converted into a bound form, whereby a reaction product is obtained, and cooling the reaction product to a solid state, whereby a solid-state electrolyte of $Li_3HalO$ formula for use in a lithium-ion battery is obtained.

The invention was described in detail with reference to specific examples and drawings. It is understood, however, that these examples and drawings should not be construed as limiting the invention and that any changes and modifications are possible without departure from the scope of the attached claims. For example, the shape of the molded solid-state Li-ion electrolyte may be different from the round and square shapes shown in the drawings. The melting process and its working characteristics may be different from the temperatures and time intervals described in the specification. The mesh may be a commercially available product or produced by different methods. The cells of the mesh may be of any shape, and the cells may be arranged regularly or at random. More than one reinforcement mesh can be used.

The invention claimed is:

1. A method of synthesizing a solid-state electrolyte for use in a lithium-ion battery, the method comprising: uniformly mixing at least LiOH and LiHal in stoichiometric quantities thus forming a uniform mixture of the at least LiOH and LiHal: heating the uniform mixture to a mixture melting temperature thus forming a mixture melt; causing a reaction of formula ($2LiOH+LiHal=Li_3HalO+H_2O$) between the at least LiOH and LiHal in a process free of forming an anti-perovskite structure and at a temperature, at which $H_2O$ that is formed in the aforementioned reaction is converted into a bound form, whereby a reaction product is obtained: and cooling the reaction product to a solid state, whereby a solid-state electrolyte for use in a lithium-ion battery is obtained; the Hal being selected at least from Cl, Br, and/or I; the synthesizing being carried out in solid electrolyte synthesizing tools comprising a container having a container bottom and made of a heat-resistant material, a cuvette having a cuvette bottom placed onto the container bottom, and a pallet having a top surface and placed onto the cuvette bottom, and wherein, prior to the step of heating the uniform mixture, the solid electrolyte synthesizing tools being preheated to a temperature in the range of 180° C. to 220° C., and the uniform mixture is then loaded onto the top surface of the pallet, wherein the cuvette is made of a metal foil, the pallet is made of metal, and the top surface of the pallet has a polished surface.

2. A method of synthesizing a solid-state electrolyte for use in a lithium-ion battery, the method comprising: uniformly mixing at least LiOH and LiHal in stoichiometric quantities thus forming a uniform mixture of the at least LiOH and LiHal; heating the uniform mixture to a mixture melting temperature thus forming a mixture melt; causing a reaction of formula ($2LiOH+LiHal=Li_3HalO+H_2O$) between the at least LiOH and LiHal in a process free of forming an anti-perovskite structure and at a temperature, at which $H_2O$ that is formed in the aforementioned reaction is converted into a bound form, whereby a reaction product is obtained; and cooling the reaction product to a solid state, whereby a solid-state electrolyte of $Li_3HalO$ formula for use in a lithium-ion battery is obtained; the Hal being selected at least from Cl, Br, and/or I; oxides of Ca, Ba, Mg, and/or Sr being selectively added to the mixture in amounts of 0.001 wt. % to 6 wt. %, to create solid solutions in the obtained solid electrolyte; wherein the synthesizing is carried out in solid electrolyte synthesizing tools comprising a container having a container bottom and made of a heat-resistant material, a cuvette having a cuvette bottom placed onto the container bottom, and a pallet having a top surface and placed onto the cuvette bottom, wherein prior to the step of heating the uniform mixture, the solid electrolyte synthesizing tools is preheated to a temperature in the range of 180° C. to 220° C. and the uniform mixture is then loaded onto the top surface of the pallet; and wherein the cuvette is made of a metal foil, the pallet is made of metal, and the top surface of the pallet has a polished surface.

* * * * *